Nov. 11, 1947. T. AAMODT ET AL 2,430,445
AIR PRESSURE SEAL
Filed June 15, 1945

INVENTORS: T. AAMODT
H. A. HILSINGER
BY J. MacDonald
ATTORNEY

Patented Nov. 11, 1947

2,430,445

UNITED STATES PATENT OFFICE 2,430,445

AIR PRESSURE SEAL

Thoralf Aamodt, Bernardsville, and Harry A. Hilsinger, Jr., East Orange, N. J., assignors to Bell Telephone Laboratories, Incorporated, New York, N. Y., a corporation of New York Application June 15, 1945, Serial No. 599,534

3 Claims. (Cl. 285—97.3)

1

This invention relates to air seal joints and more particularly to a type of rotary air seal joint for use, for example, in the wave guide of radars, and other radio signal transmitting and receiving apparatus.

In radar apparatus using pressurized wave guides, an air tight joint must be provided between the stator element and the rotor element of the wave guide. In actual use of such radar apparatus a substantial reduction of the air pressure in the wave guide component due to faulty joints between the rotor element and the stator element has been found to affect the electrical characteristic of the wave guide component to a point where the information furnished by the radar apparatus is no longer intelligible.

The applicants are aware that in connection with radar apparatus using pressurized wave guides, that numerous types of air seal joints are in use in which rings of rubber and of other non-metallic material serve to form the joint between the rotor element and the stator element of the wave guide.

However, none of the air seal joints now in actual use has been found, even with a high pressure contact of the rubber ring between the rotor element and the stator element of the wave guide, to afford a sufficiently tight closure to maintain the air pressure in the wave guide within the required pressure value after a short period of time in actual operation, and that these joints produce too great a torque load to the scanning movement of the antenna and wear rapidly, especially when the radar apparatus is used in high altitudes where the joints are subjected to sub-zero temperatures, and while heating arrangements are sometimes used for maintaining the joints at above subzero temperature, these arrangements have been found to be cumbersome, costly and the weight most objectionable for use in airplanes, especially those of the military type.

The object of this invention is the provision of a rotary air seal joint of the type above referred to, which will operate satisfactorily at the required operating subzero temperatures to which the antenna may be subjected in actual scanning operations without the use of heater devices, which will have a low torque load, resistant to wear, cheap to manufacture, and capable of efficient operation for a long period of time at any practical scanning speed of the antenna.

Figure 1:
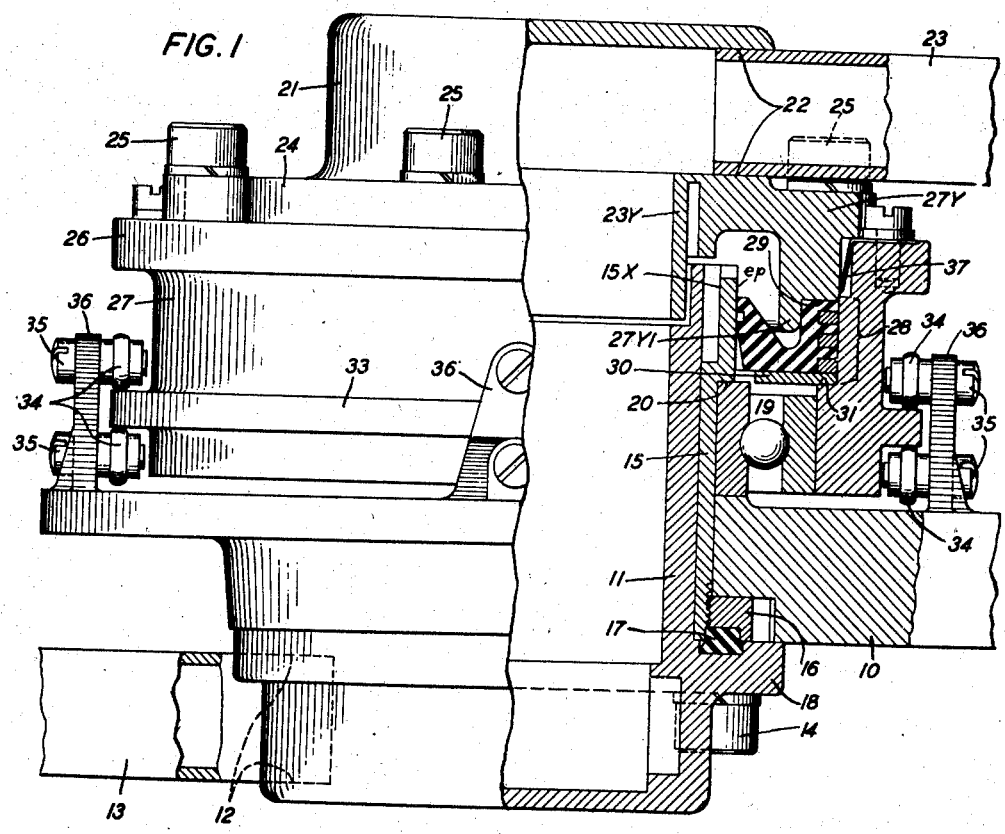
Fig. 1 is an assembly view of the rotary air joint of this invention enlarged, shown partly in vertical section.

In the construction of the rotary air seal joint of this invention, a plate 10 is provided for mounting a wave guide sleeve 11 having a rectangularly shaped and radially disposed opening 12 at its lower disposed end for receiving one end of a wave guide element in the form of a tubing 13 of rectangular cross-section, a flange 18, being formed with the sleeve 11 for securing the latter to the mounting plate 10 by a plurality of screws 14. On sleeve 11, is closely fitted a sleeve 15 held against longitudinal movement thereon by a nut ring 16, abutting against the mounting plate 10, the tightening action of nut ring 16 being effective to clamp the inner race ring of a ball bearing 19 between the mounting plate 10 and a shoulder portion 20 formed with the sleeve 15, while splines as 15X formed interiorly of sleeve 15 are provided for holding the sleeve by means of a socket wrench during the tightening operation of nut ring 16, while a ring 17 of elastic material is clamped between the nut ring 16, the edge of sleeve 15 and the flange portion 18 formed with sleeve 11 by the tightening action of screws 14.

A wave guide element 21 is provided with a sleeve portion 23Y fitted for free rotation in the wave guide sleeve 11 and with an opening 22 for receiving one end of a wave guide tubing 23. The wave guide element 21 is formed with a flange portion 24 having clearance holes through which screws 25 extend in engagement with similarly screw-threaded holes in a flange 26 formed with a collar member 27. This collar at its lower end is held in concentric relation with the longitudinal axis of wave guide sleeve 11 through its engagement with the outer disposed ring of ball bearing 19 while the flange 24 is provided with a downwardly extending rim portion 27Y serving for clamping a seal ring 28 between the flat surface 29 of rim portion 27Y and a flat washer 30 resting on a shoulder portion 31 formed interiorly of collar 27.

The seal ring 28 is constructed of an elastic material of a composition comprising by weight of:

| | |
|---|---|
| Neoprene | 100 |
| Neozone | 1.5 |
| Stearic acid | 0.5 |
| "Pelletex" carbon black | 75 |
| Tributoxyethyl phosphate | 25 |
| Petrolatum | 2 |
| Litharge | 10 |
| Sulphur | 1.5 |
| Total | 215.5 |

Figures 3, 4:
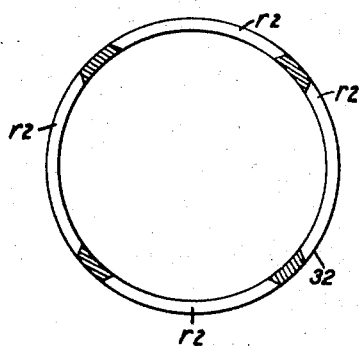
Fig. 3 is a view in actual size of the metallic spring ring used in the construction of the sealing ring.
Fig. 4 is a sectional view of the spring ring taken on line 4—4 of Fig. 3.
Figure 2:
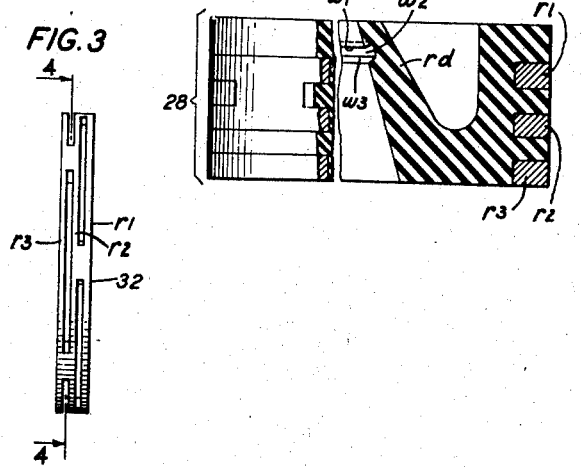
Fig. 2 is a view of the combined sealing ring enlarged shown partly in section and with portions broken away.

This seal ring is vulcanized to a metallic spring ring 32 shown in detail in Figs. 3 and 4. The spring ring 32 is in the form of superposed staggered ribs $r1$, $r2$, $r3$ with the elastic material filling the interstices between the ribs $r1$, $r2$ and $r3$ so as to form a seal against the inner wall surface of collar portion 27 upon the compressing of the elastic material and the metallic spring ring by the tightening of screws 25 thus preventing air leak in its region of contact with the rim 27Y, with a circular projection 27Y1 formed with rim 27Y and with the washer 30. The elastic material of the sealing ring is formed with a circular ridge $rd$ of an inside diameter smaller than that of the diameter of the enlarged portion $ep$ of sleeve 15 with which it forms the seal to cause the ridge $rd$ to change its shape to that of the parallel sides of the cylindrical portion $ep$ of sleeve 15 and to exert a predetermined pressure therearound, the ridge $rd$ of the seal ring being provided with a circular container formed by the wall surfaces $w1$, $w2$, and $w3$ to be filled with a lubricant in the form of a mineral grease provided for lubricating the surface of the rim $rd$, thus in rotary frictional contact with that portion of the surface $ep$ of stationary sleeve 15.

On the flange 24 as shown in Fig. 1 are secured by screws 40, two diametrically opposed pawl-shaped springs 37, the function of which is to move by the medium of their own resiliency in the path of the sealing ring 28 so as to hold the latter in position in the collar 27, upon the removal of the wave guide section 21 from collar 27, which is effected by the simple removal of screws 25 above mentioned.

The collar 27 is formed with a circular ridge 33 which is engaged, as shown in Fig. 1, by a plurality of pairs of equally spaced rollers 34 mounted on spindles as 35 extending perpendicularly from upright supports 36 carried by the mounting plate 10 for holding the collar 27 and thereby the sealing ring 28 from longitudinal movement relative to sleeve 15 as against the air pressure tending to separate the wave guide section 21 from its complement section formed by sleeve 11.

The seal of this invention has been found in actual tests to possess air-tight sealing characteristics within the operating requirement of the antenna, with a minimum of frictional torque load, and to be resistant to wear at speeds ranging from low to maximum scanning speed of the antenna, while making possible to avoid the use of any heating apparatus.

What is claimed is:

1. In an air seal joint for pressurized wave guide in a radar apparatus, said joint having a rotor element, and stator element, a sealing ring disposed between said rotor element and said stator element, said sealing ring comprising a metallic spring ring formed of a plurality of superposed staggered rib-shaped portions and a ring of elastic material vulcanized to said metallic spring ring with the elastic material filling the interstices between said rib-shaped portions of said metallic spring ring.

2. In an air seal rotary joint for a pressurized wave guide in a radar apparatus, a stationary wave guide element having a sleeve portion, a sleeve fitted over said wave guide sleeve having a shoulder portion at one end and a screw-threaded portion at its other end, a mounting plate for said stationary wave guide, a ball bearing mounted on the second-mentioned sleeve, a screw-threaded ring engaging the screw-threaded portion of the second-mentioned sleeve for clamping said ball bearing between the shoulder portion of the latter sleeve and said mounting plate, and a ring of elastic material disposed between said screw-threaded ring, the edge of the last-mentioned sleeve and said plate to form an air seal at these points.

3. In an air seal rotary joint for a pressurized wave guide in a radar apparatus, said joint having a rotatable element and a stationary element, a sealing ring, said sealing ring consisting of a metallic spring ring formed of a plurality of superposed staggered rib members and a ring of elastic material vulcanized to said spring ring and having portions filling the interstices between said rib members and forming with said spring ring a peripheral portion for securing said ring in one of said elements, and a ridge portion formed with said elastic ring frictionally engaging the other of said elements, said ridge portion having means for receiving a lubricant for lubricating the portion of said ridge which frictionally engages the last-mentioned element.

THORALF AAMODT.
HARRY A. HILSINGER, JR.

REFERENCES CITED

The following references are of record in the file of this patent:

UNITED STATES PATENTS

| Number | Name | Date |
|---|---|---|
| 2,356,351 | Phillips | Aug. 22, 1944 |
| 2,373,443 | Armington | Apr. 10, 1945 |

FOREIGN PATENTS

| Number | Country | Date |
|---|---|---|
| 207,999 | Great Britain | Dec. 13, 1923 |